April 13, 1965 W. H. AUERSWALD 3,178,065
IMPERMEABLE COLLAPSIBLE TUBE
Filed Jan. 22, 1963
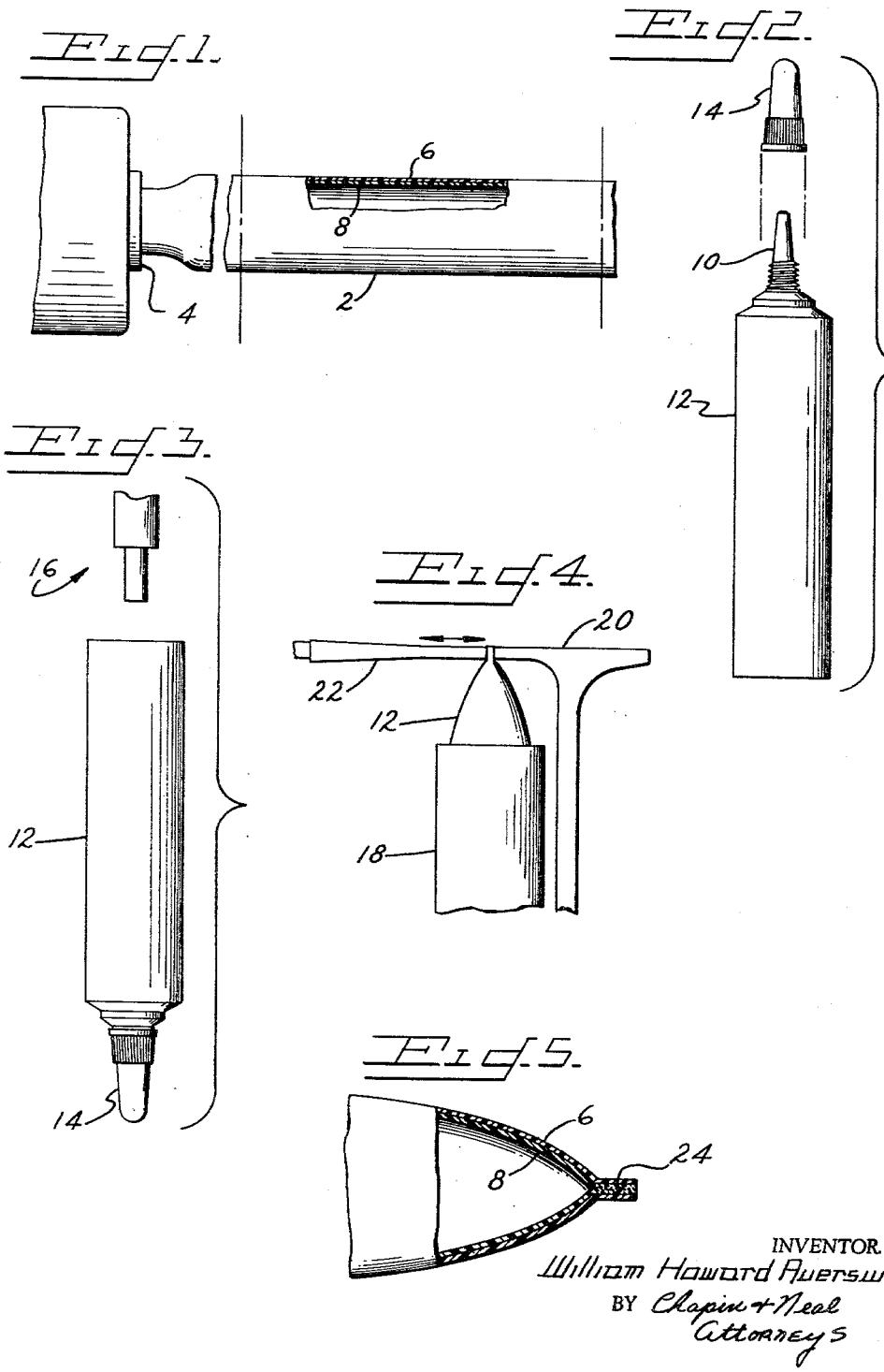
INVENTOR.
William Howard Auerswald
BY Chapin + Neal
Attorneys

3,178,065
IMPERMEABLE COLLAPSIBLE TUBE
William Howard Auerswald, Longmeadow, Mass., assignor to Tubed Chemicals Corporation, Easthampton, Mass., a corporation of Delaware
Filed Jan. 22, 1963, Ser. No. 253,103
3 Claims. (Cl. 222—107)

This invention relates to tubular containers made of organic plastic material and particularly to articles of a relatively thin wall character such as collapsible dispenser tubes of polyethylene. The object of the invention is to provide collapsible plastic tubes impermeable to essential oils, flavorings, perfumes or solvents which are found in various substances which have not heretofore been packaged in plastic tubes such as polyethylene.

It is common knowledge in the art that a plastic tube made from polyethylene is not suitable for holding many products such as toothpaste where the appeal to consumers is largely dependent on their holding the products over long period of time, because the perfumes and flavorings gradually penetrate through polyethylene and through this evaporation or permeation, lose their effectiveness. There are also compounds containing organic solvents which penetrate through the tubes so that the tubes gradually become flabby and lose weight and will no longer pass critical examination by weights and measures inspectors taking samples from store shelves.

Attempts to overcome these disadvantages of polyethylene tubes by lacquering the exterior surfaces have been ineffective insofar as I am aware. The disadvantages have been somewhat overcome by coating interior surfaces of the tubes with selected lacquers or solutions of special plastics. However, it is then necessary to set or dry the solvents out of these interior coatings. Moreover, it is as a rule necessary to treat the interior surfaces of the tubes by flame treatment or corona discharge to increase the adhesion of the dried down films and furthermore, in order to heat seal the ends of the tubes, it has been found necessary to limit coatings of the interior to leave about ¼ inch of the open ends of the tubes uncoated.

Such attempts to solve the problems involve extra operations and complexities of manufacture. Also with time the interior films often separate from the bodies of the tube and become unsightly when the tubes are transparent and sometimes even extrude out of the opening of the tube. Also if the interior coating material extends into the seal area it is usually impossible to make a strong heat seal on the tube. In order to get a strong heat seal there is usually a small unprotected area left between the seal and the interior coating. Through this area permeation takes place. Occasionally materials will also attack and tend to separate the coating.

It might be supposed that instead of an interior surface coating the bodies of collapsible tubes might be made of two different plastics, the inner one of which would be relatively impermeable to flavors, essential oils, perfumes and most organic substances and its end terminating short of the outer plastic. However, it will be appreciated that it is difficult and impractical, if not impossible, practically speaking, to leave a portion of the interior of the main body of the tube free of the resistant plastic and then seal the other plastic material. The result would be a seal all too often charred by the heat of the ultimate closing device, because of the different plastic materials and reaction to heat. Also a satisfactory seal would not be assured if the end edge of the inner ply did not abut the seal area exactly.

I have found that this problem of permeability feature can be solved by the use of tube walls made up of bonded together plys or layers of two or more plastics, one of which can be selected for its ability to retard permeation from the inside contents to the exterior surface of the tube when the contents include organic flavorings, perfumes and solvents. Such tubes may be extruded with a plurality of plies or layers of different plastic materials which are firmly bonded together along the entire length thereof, the tube then cut into the desired container body lengths, and fitted with cap or dispenser tip openings at one end to be filled through the other end. Alternatively, the two-ply tubes and dispenser tip ends may be formed by other known methods and steps such as by calendering sheets and rolling into tube form to provide a firmly bonded two-ply body. In each case the tube body is formed with one ply, preferably the inner ply, selected for its properties of impermeability with respect to the intended contents of the container. The other ply, as polyethylene, is chosen for its known satisfactory properties for squeeze tube characteristics.

The seal after filling the body with the contents to be packaged is made by transversely flattening the open end and ultrasonically welding the contacting surface areas of the inner ply of the tube. A seal is thus formed in which the inner layer area only is fused and no heat is imparted to the outer layer which might char or otherwise affect the neat appearance and security of the sealed area. Ultra sonic sealing equipment suitable for this purpose is available commercially, such as Model #401 of Ultra Sonic Seal Inc., and, as will be known to those skilled in the art the tube end is flattened for sealing between a continuously hammering tool tip and solid anvil.

Depending upon the nature of the materials to be held by the container, the types of plastics bonded together may comprise polyethylenes of various known formulas and characteristics, preferably forming an outer layer, and for a second preferably inner layer may comprise polyvinylchlorides, polyvinylidene chlorides, polyvinyl acetates, polypropylenes, nylons, polyacrilonitrile, etc. and the co-polymers of all of these and equivalent plastics which will, depending upon the material to be contained appeal to those skilled in the art. For example, toothpaste may be contained in a plastic squeeze tube having polyethylene for the outer layer material and polyvinylidene chloride for the inner layer. Where the substance to be held contains solvents the inner layer material may, for example, be nylon to insure impermeability.

The accompanying drawings schematically illustrate the steps in the process of forming the new tube. In FIG. 1 the step of extruding a tube 2 is shown with a die nozzle at 4, the tube having two plies 6 and 8 firmly bonding together in the extrusion process. Ply 6 may be polyethylene for its known qualities satifactory to squeeze tube use and the ply 8 being of polyvinylidene chloride material known for example to be impermeable to toothpaste flavoring. FIG. 2 shows a dispenser tip at 10 which may be formed and bonded by known molding processes to one end of the tube container body 12. The cap 14 is thereafter threaded on the tip 10 and the tube filled through its open end, as by a filling nozzle indicated at 16. The final step of sealing the end is shown by FIG. 4 with a tube carrier at 18, the sealing anvil at 20 and reciprocable transducer tool at 22. The tool transversely flattens the open end against the anvil and the fusion of the contacting surfaces of the inner ply takes place as previously described. The sealed end is shown by FIG. 5 with the fused area of the inner ply indicated by numeral 24.

What is claimed is:

1. In a collapsible tubular container having a wall comprising a plurality of firmly adhereing layers of plastic material throughout its entire length with an opening for dispensing the contents of the container at one end, and an end closure seal at the other end transversely flattening the tube wall, one of said layers of wall material being impermeable to the contents of the tube, the improvement which comprises the said end closure seal having plastic material of the inner layer fuzed only at the interface area between the flattened contacting inner wall surfaces thereof and said layers otherwise retaining the individual physical characteristics of each plastic material in the area of said end closure.

2. The tube of claim 1 in which one of said layers is polyethylene and the other layer is impermeable to solvent flavoring and aromatic substances.

3. The tube of claim 1 having an outer layer of polyethylene and an inner layer of polyvinylidene chloride.

References Cited by the Examiner
UNITED STATES PATENTS

| | | | |
|---|---|---|---|
| 2,274,258 | 2/42 | Roselle | 222—107 |
| 2,287,259 | 6/42 | Lindstrom | 220—71 |
| 2,435,251 | 2/48 | Tome | 222—92 |
| 2,485,885 | 10/49 | Hoopes. | |
| 2,663,461 | 12/53 | Brown | 222—107 |
| 2,667,437 | 1/54 | Zoubek. | |
| 2,724,863 | 11/55 | Gudge et al. | 222—107 X |
| 2,860,801 | 11/58 | Nielsen. | |
| 2,861,718 | 11/58 | Winzen | 222—107 X |
| 2,872,760 | 2/59 | Meissner | 53—20 |
| 2,941,689 | 6/60 | Black. | 220—63 |
| 2,962,843 | 12/60 | Hoelzer et al. | 53—20 |
| 2,968,576 | 1/61 | Keller et al. | |
| 2,977,264 | 3/61 | Shapero. | |

RAPHAEL M. LUPO, *Primary Examiner.*